United States Patent
Szyszko et al.

(10) Patent No.: US 12,418,476 B2
(45) Date of Patent: Sep. 16, 2025

(54) DISTRIBUTED BROADBAND NETWORK GATEWAY STATEFUL N+1 HOT-REDUNDANCY

(71) Applicant: Juniper Networks, Inc., Sunnyvale, CA (US)

(72) Inventors: Andrzej W. Szyszko, Holden, MA (US); Nagaraj S. Turaiyur, Bangalore (IN); John E. Ziegler, Westborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 75 days.

(21) Appl. No.: 18/478,181

(22) Filed: Sep. 29, 2023

(65) Prior Publication Data

US 2024/0406097 A1 Dec. 5, 2024

(30) Foreign Application Priority Data

Jun. 1, 2023 (IN) .............................. 202341037762

(51) Int. Cl.
*H04L 45/302* (2022.01)
*H04L 12/28* (2006.01)
*H04L 45/42* (2022.01)

(52) U.S. Cl.
CPC ...... *H04L 45/3065* (2013.01); *H04L 12/2859* (2013.01); *H04L 45/42* (2013.01)

(58) Field of Classification Search
CPC .. H04L 45/3065; H04L 12/2859; H04L 45/42
See application file for complete search history.

(56) References Cited

U.S. PATENT DOCUMENTS

| | | | | |
|---|---|---|---|---|
| 7,450,494 B2* | 11/2008 | Koyuncuoglu | ............ | H04J 3/14 370/386 |
| 7,990,993 B1* | 8/2011 | Ghosh | ................... | H04L 45/025 370/428 |
| 8,614,943 B2* | 12/2013 | Li | ........................... | H04L 45/00 370/220 |
| 10,756,813 B1* | 8/2020 | Rajaram | ............ | H04B 10/0793 |
| 10,855,517 B2* | 12/2020 | Ghadge | ............... | H04L 43/0817 |
| 11,324,077 B2* | 5/2022 | Pani | ........................ | H04L 12/66 |
| 11,956,328 B1* | 4/2024 | Pani | .................... | H04L 41/0627 |
| 2005/0120139 A1* | 6/2005 | Kochhar | ............... | H04J 3/0685 709/248 |

(Continued)

*Primary Examiner* — Oanh Duong
(74) *Attorney, Agent, or Firm* — Harrity & Harrity, LLP

(57) ABSTRACT

In some implementations, a redundant DBNG user plane device may maintain respective subscriber states of a plurality of primary DBNG user plane devices. The redundant DBNG user plane device may determine, based on maintaining the respective subscriber states of the plurality of primary DBNG user plane devices, that a particular primary DBNG user plane device, of the plurality of primary DBNG user plane devices, is not active. The redundant DBNG user plane device may identify, based on determining that the particular primary DBNG user plane device is not active, a subscriber state of the particular primary DBNG user plane device. The redundant DBNG user plane device may operate, using the subscriber state of the particular primary DBNG user plane device, as an active DBNG user plane device for traffic associated with the particular primary DBNG user plane device.

20 Claims, 8 Drawing Sheets

(56) References Cited

U.S. PATENT DOCUMENTS

| | | | |
|---|---|---|---|
| 2010/0083356 A1* | 4/2010 | Steckley | H04L 12/2834 |
| | | | 726/5 |
| 2018/0006876 A1* | 1/2018 | Funasaki | H04L 45/22 |
| 2022/0061129 A1* | 2/2022 | Pani | H04L 12/66 |
| 2023/0039815 A1* | 2/2023 | Pani | H04L 43/10 |
| 2023/0164052 A1* | 5/2023 | Pani | H04L 43/10 |
| | | | 709/224 |
| 2024/0333582 A1* | 10/2024 | Song | H04L 41/0663 |

* cited by examiner

DISTRIBUTED BROADBAND NETWORK GATEWAY STATEFUL N+1 HOT-REDUNDANCY

CROSS-REFERENCE TO RELATED APPLICATION

This Patent Application claims priority to India Patent Application No. 202341037762, filed on Jun. 1, 2023, and entitled "BROADBAND NETWORK GATEWAY CONTROL AND USER PLANE SEPARATION STATEFUL N+1 HOT-REDUNDANCY." The disclosure of the prior Application is considered part of and is incorporated by reference into this Patent Application.

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QOS) policies, among other examples.

SUMMARY

In some implementations, a method includes maintaining, by a redundant disaggregated broadband network gateway (DBNG) user plane device, respective subscriber states of a plurality of primary DBNG user plane devices; determining, by the redundant DBNG user plane device, and based on the maintaining the respective subscriber states of the plurality of primary DBNG user plane devices, that a particular primary DBNG user plane device, of the plurality of primary DBNG user plane devices, is not active; identifying, by the redundant DBNG user plane device and based on determining that the particular primary DBNG user plane device is not active, a subscriber state of the particular primary DBNG user plane device; and operating, by the redundant DBNG user plane device and using the subscriber state of the particular primary DBNG user plane device, as an active DBNG user plane device for traffic associated with the particular primary DBNG user plane device.

In some implementations, a non-transitory computer-readable medium storing a set of instructions includes one or more instructions that, when executed by one or more processors of a redundant DBNG user plane device, cause the redundant DBNG user plane device to: maintain respective subscriber states of a plurality of primary DBNG user plane devices; determine, based on maintaining the respective subscriber states of the plurality of primary DBNG user plane devices, that a particular primary DBNG user plane device is not active; and operate, using a subscriber state of the particular primary DBNG user plane device, as an active DBNG user plane device for traffic associated with the particular primary DBNG user plane device.

In some implementations, a redundant DBNG user plane device includes one or more memories; and one or more processors to: maintain respective subscriber states of a plurality of primary DBNG user plane devices; determine, based on maintaining the respective subscriber states of the plurality of primary DBNG user plane devices, that a particular primary DBNG user plane device is not active; and operate, using a subscriber state of the particular primary DBNG user plane device, as an active DBNG user plane device.

DETAILED DESCRIPTION

Figure 1A:
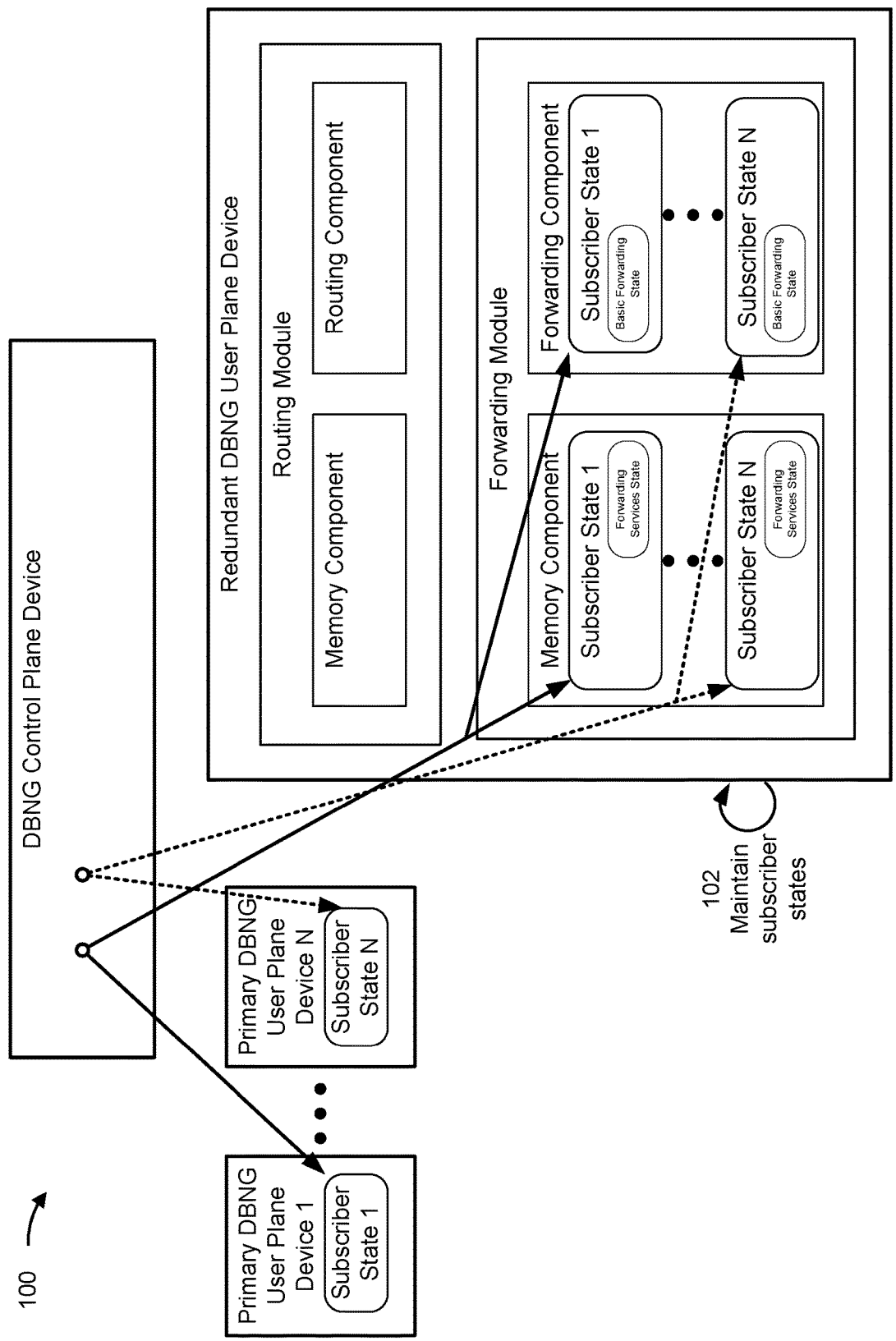
FIGS. 1A-1D are diagrams of an example implementation associated with DBNG stateful N+1 hot-redundancy.

The following detailed description of example implementations refers to the accompanying drawings. The same reference numbers in different drawings may identify the same or similar elements.

To accommodate growth in a quantity of subscribers, a quantity and types of services being provided by broadband network gateways (BNGs), and an amount of traffic being processed by the BNGs, a disaggregated BNG (DBNG) may be deployed by a service provider. The DBNG physically and logically provides control and user plane separation (CUPS). For example, software to perform control plane functions may be distributed for execution by a centralized control plane comprising one or more devices. Two or more user plane devices to implement multiple user planes, which may include physical network devices, remain in a forwarding path between subscriber devices and a network to process traffic (e.g., packet flows) between the subscriber devices and the network. In some cases, a user plane device can fail or otherwise cease to be active, which causes traffic handled by the user plane device to be delayed, lost, dropped, and/or otherwise not communicated. Accordingly, this negatively impacts a performance of the user plane and the DBNG.

In some cases, a 1:1 hot-redundancy can be used to provide a redundant user plane device for a primary user plane device, where the redundant user plane device is configured in a same or similar manner as the primary user plane device, and a state of the primary user plane device is regularly backed up to the redundant user plane. In this way, when the primary user plane device fails, the redundant user plane device can become active and process traffic with little disruption to subscriber devices. However, this approach leads to inefficient use of computing resources (e.g., processing resources, memory resources, communication resources, and/or power resources, among other examples) of the redundant user plane device (e.g., because the redundant user plane device does not process traffic while the primary user plane device is active) and is subject to scalability challenges (e.g., it is often impractical, in terms of deployment and maintenance, for every user plane device in a DBNG to be backed up by an individual redundant user plane device).

Some implementations described herein include a redundant disaggregated broadband network gateway (DBNG) user plane device. The redundant DBNG user plane device is configured to provide a stateful N+1 hot-redundancy. That is, the redundant DBNG user plane device maintains respective subscriber states of a plurality of primary DBNG user plane devices, and is able to quickly provide a switchover to operate as an active DBNG user plane device upon a primary DBNG user plane device ceasing to be active.

For example, the redundant DBNG user plane device may determine that a particular primary DBNG user plane device is not active, and may thereby identify a subscriber state (e.g., of a plurality of subscriber states maintained by the redundant DBNG user plane device) of the particular primary DBNG user plane device. The redundant DBNG user plane device then uses the subscriber state of the particular primary DBNG user plane to operate as an active DBNG user plane device.

In some implementations, in a first type of the stateful N+1 hot-redundancy, the redundant DBNG user plane device maintains the respective subscriber states of the plurality of primary DBNG user plane devices in a forwarding module of the redundant DBNG user plane device. For example, the redundant DBNG user plane device may include a first portion of the subscriber state (e.g., a basic forwarding state) in a forwarding component of the forwarding module, and may include a second portion of the substrate (e.g., a forwarding services state) in a memory component of the forwarding module. To operate as an active DBNG user plane device, the redundant DBNG user plane device installs the second portion of the subscriber state (e.g., the forwarding services state) of the particular primary DBNG user plane device (e.g., from the memory component) in the forwarding component of the forwarding module (e.g., to allow both the first portion of the subscriber state and the second portion of the subscriber state to be utilized by the forwarding component). In a second type of the stateful N+1 hot-redundancy, the redundant DBNG user plane device maintains the respective subscriber states of the plurality of primary DBNG user plane devices in a routing module (e.g., a memory component of the routing module) of the redundant DBNG user plane device. To operate as an active DBNG user plane device, the redundant DBNG user plane device installs the subscriber state of the particular primary DBNG user plane device (e.g., from the memory component of the routing module) in a forwarding component of the forwarding module of the redundant DBNG user plane device.

In this way, by employing the first type or the second type of the stateful N+1 hot-redundancy, the redundant DBNG user plane is able to operate as an active DBNG user plane device for traffic associated with any of the primary DBNG user plane devices that cease to be active. Accordingly, because the redundant DBNG user plane device can provide redundancy for multiple primary DBNG user plane devices, the stateful N+1 hot-redundancy approach enables a more efficient use of computing resources (e.g., processing resources, memory resources, communication resources, and/or power resources, among other examples) of the redundant DBNG user plane device, as compared to a 1:1 hot-redundancy approach (e.g., because the redundant DBNG user plane device is more likely to be acting as an active DBNG user plane device due to a greater likelihood that any one of the plurality of primary DBNG user plane devices is not active). Further, it is more practical to use a single redundant DBNG user plane device for multiple primary DBNG user plane devices, which makes the stateful N+1 hot-redundancy approach more scalable (e.g., in terms of deployment and maintenance) than the 1:1 hot-redundancy approach. Additionally, employing the first type of the stateful N+1 hot-redundancy reduces a likelihood that the traffic is delayed, lost, dropped, and/or otherwise not communicated (e.g., as a result of a primary DBNG user plane device ceasing to be active) because a first a portion of subscriber state of the primary DBNG user plane device is already installed in the forwarding component of the forwarding module of the redundant DBNG user plane device. Accordingly, this improves a performance of an associated user plane and the DBNG.

FIGS. 1A-1D are diagrams of an example implementation 100 associated with DBNG stateful N+1 hot-redundancy. As shown in FIGS. 1A-1D, example implementation 100 includes a plurality of primary DBNG user plane devices (shown as primary DBNG user plane devices 1 through N, where N≥2), a DBNG control plane device, and a redundant DBNG user plane device (e.g., that are associated with a DBNG). These devices are described in more detail below in connection with FIGS. 2-4.

In some implementations, as shown in FIGS. 1A-1D, each primary DBNG user plane device may have a subscriber state (e.g., the primary DBNG user plane device 1 has a subscriber state 1, and the primary DBNG user plane device N has a subscriber state N). A subscriber state may indicate information associated with subscribers of a primary DBNG user plane device and may indicate, for example, one or more dynamic interface states, one or more traffic detection and forwarding rules, one or more filtering rules, one or more service level agreement (SLA) rules, one or more statistics collection rules, one or more credit control rules, one or more traffic mirroring rules, one or more application aware policies, and/or one or more lawful interception rules. The subscriber state may include one or more states (e.g., sub-states), such as a basic forwarding state (e.g., that includes basic packet forwarding information) and/or a forwarding services state (e.g., that includes filters and/or policies, hardware queues, statistics counters, and/or the like).

Figure 1B:
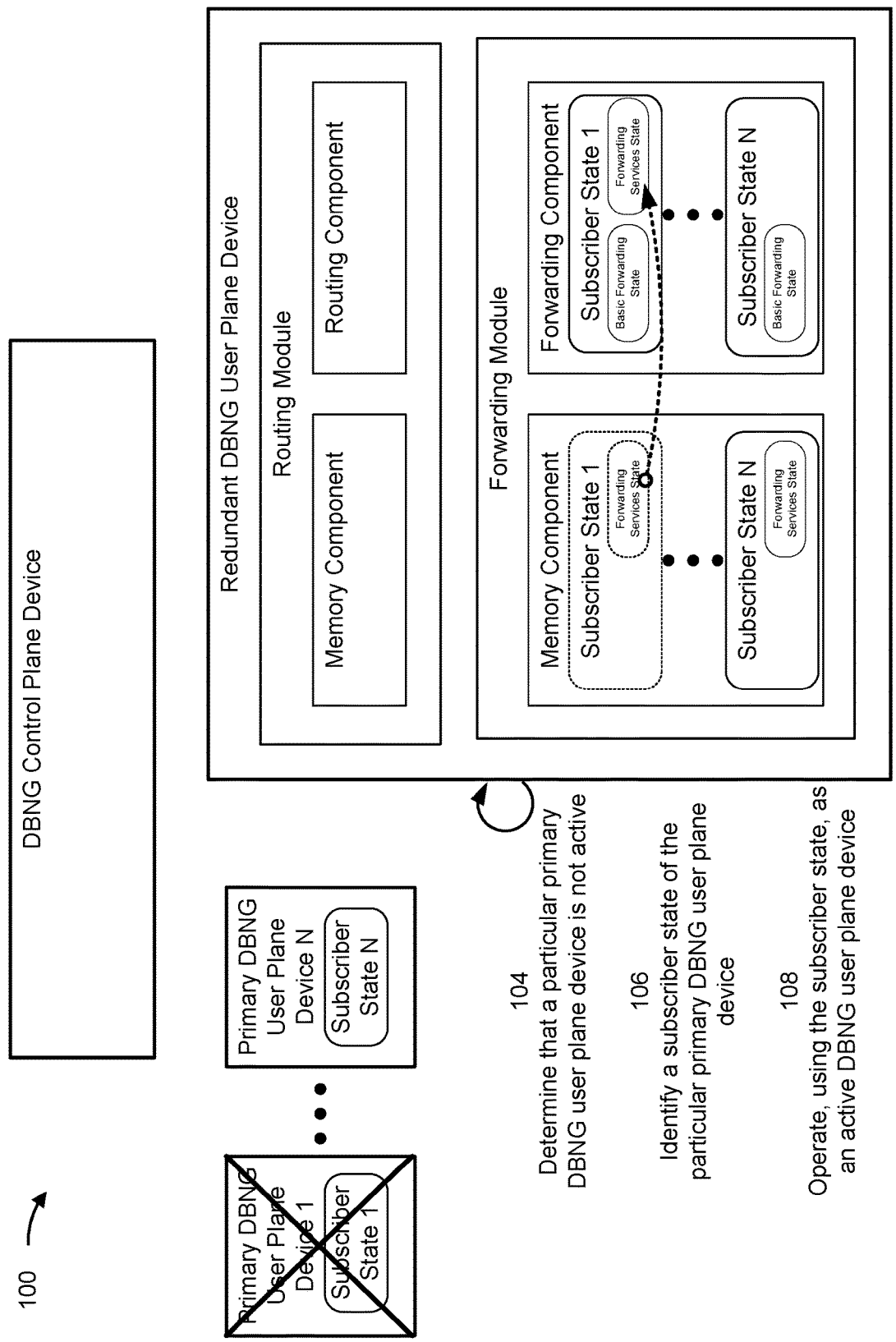

FIGS. 1A-1B show example operations that are associated with employment of a first type of the stateful N+1 hot-redundancy (e.g., for the plurality of primary DBNG user plane devices).

As shown in FIG. 1A, and by reference number 102, the redundant DBNG user plane device may maintain respective subscriber states of the plurality of primary DBNG user plane devices. In some implementations, the plurality of primary DBNG user plane devices may communicate with the DBNG control plane device to obtain update information associated with the respective subscriber states (e.g., that indicates any changes to the respective subscriber states since previous update information was obtained). Additionally, the redundant DBNG user plane device may communicate with the DBNG control plane device to obtain the update information from the DBNG control plane device. Accordingly, the redundant DBNG user plane device may obtain the update information at a same time (e.g., in parallel) as the plurality primary DBNG user plane devices. The redundant DBNG user plane device then may store the update information (e.g., in a data structure), which allows the redundant DBNG user plane device to maintain the respective subscriber states of the plurality of primary DBNG user plane devices.

In a specific example (e.g., that is associated with employing the first type of stateful N+1 hot-redundancy), as further shown in FIG. 1A, the redundant DBNG user plane device may maintain the respective subscriber states of the plurality of primary DBNG user plane devices in a forwarding module (e.g., a forwarding engine module, or a similar type of forwarding module) of the redundant DBNG user plane device. The redundant DBNG user plane device may include a first portion of the subscriber state (e.g., the basic forwarding state) in a forwarding component of the forwarding module, and may include a second portion of the substrate (e.g., the forwarding services state) in a memory component of the forwarding module.

As shown in FIG. 1B, and by reference number 104, the redundant DBNG user plane device may determine (e.g., based on maintaining the respective subscriber states of the plurality of primary DBNG user plane devices) that a particular primary DBNG user plane device, of the plurality of primary DBNG user plane devices, is not active (e.g., because the particular primary DBNG user plane device has failed, is down due to maintenance, or is not active for another reason). As an example, as shown in FIG. 1B, the redundant DBNG user plane device may determine that the primary DBNG user plane device 1 is not active.

In some implementations, the DBNG user plane device may monitor a link (e.g., a pseudowire or another type of link) that is associated with the particular primary DBNG user plane device (e.g., that is a backup link for traffic processed by the primary DBNG user plane device). For example, the redundant DBNG user plane device may monitor the link for activity information. Based on monitoring the link, the DBNG user plane device may determine that the particular primary DBNG user plane device is not active (e.g., due a lack of activity information provided via the link, or a change in status of the activity information). Additionally, or alternatively, the DBNG user plane device may communicate with the DBNG control plane device and may thereby determine (e.g., based on the DBNG control plane device providing information that the particular primary DBNG user plane device is not active) that the particular primary DBNG user plane device is not active.

As shown by reference number 106, the redundant DBNG user plane device may identify a subscriber state of the particular primary DBNG user plane device (e.g., that is not active). For example, the redundant DBNG user plane device may identify the subscriber state in the forwarding module (e.g., in the memory component of the forwarding module) of the redundant DBNG user plane device.

As shown by reference number 108, the redundant DBNG user plane device may operate, using the subscriber state of the particular primary DBNG user plane device (e.g., that is not active), as an active DBNG user plane device. For example, the redundant DBNG user plane device, using the subscriber state, may operate as an active DBNG user plane device for traffic that is associated with the particular primary DBNG user plane device (e.g., for traffic that would otherwise be processed by the particular primary DBNG user plane device if the primary DBNG user plane device were to be active).

In a specific example (e.g., that is associated with employing the first type of stateful N+1 hot-redundancy), as further shown in FIG. 1B, to operate as an active DBNG user plane device, the redundant DBNG user plane device may utilize the subscriber state (shown as subscriber state 1) of the particular primary DBNG user plane device in the forwarding module. For example, the redundant DBNG user plane device may install the second portion of the subscriber state (e.g., the forwarding services state) in the memory component in the forwarding component of the forwarding module. In this way, the subscriber state may be fully installed in the forwarding component (e.g., both the first portion and the second portion of the subscriber state are installed in the forwarding component). The redundant DBNG user plane device then may forward, using the forwarding module (e.g., using the forwarding component of the forwarding module), the traffic that is associated with the particular primary DBNG user plane device (e.g., that was previously handled by the particular primary DBNG user plane device). In some implementations, because the first portion of the subscriber state is already included in the forwarding component of the forwarding module and because the second portion of the subscriber state is installed from the memory component of the forwarding module in the forwarding component of the forwarding module, an amount of time for the redundant DBNG user plane device to operate as an active DBNG user plane device for the traffic (e.g., a switchover time) may be reduced (e.g., as compared to when non-hot redundancy is employed; or as compared to installing the subscriber state from another module of the redundant DBNG user plane device, such as when a second type of stateful N+1 hot-redundancy, described herein, is employed). For example, the redundant DBNG user plane device may use the first portion of the subscriber state (e.g., the basic forwarding state) immediately upon operating as an active DBNG user plane, and the redundant DBNG user plane device may use the second portion of the subscriber state (e.g., the forwarding services state) upon successful completion of installment in the forwarding component.

Figure 1C:
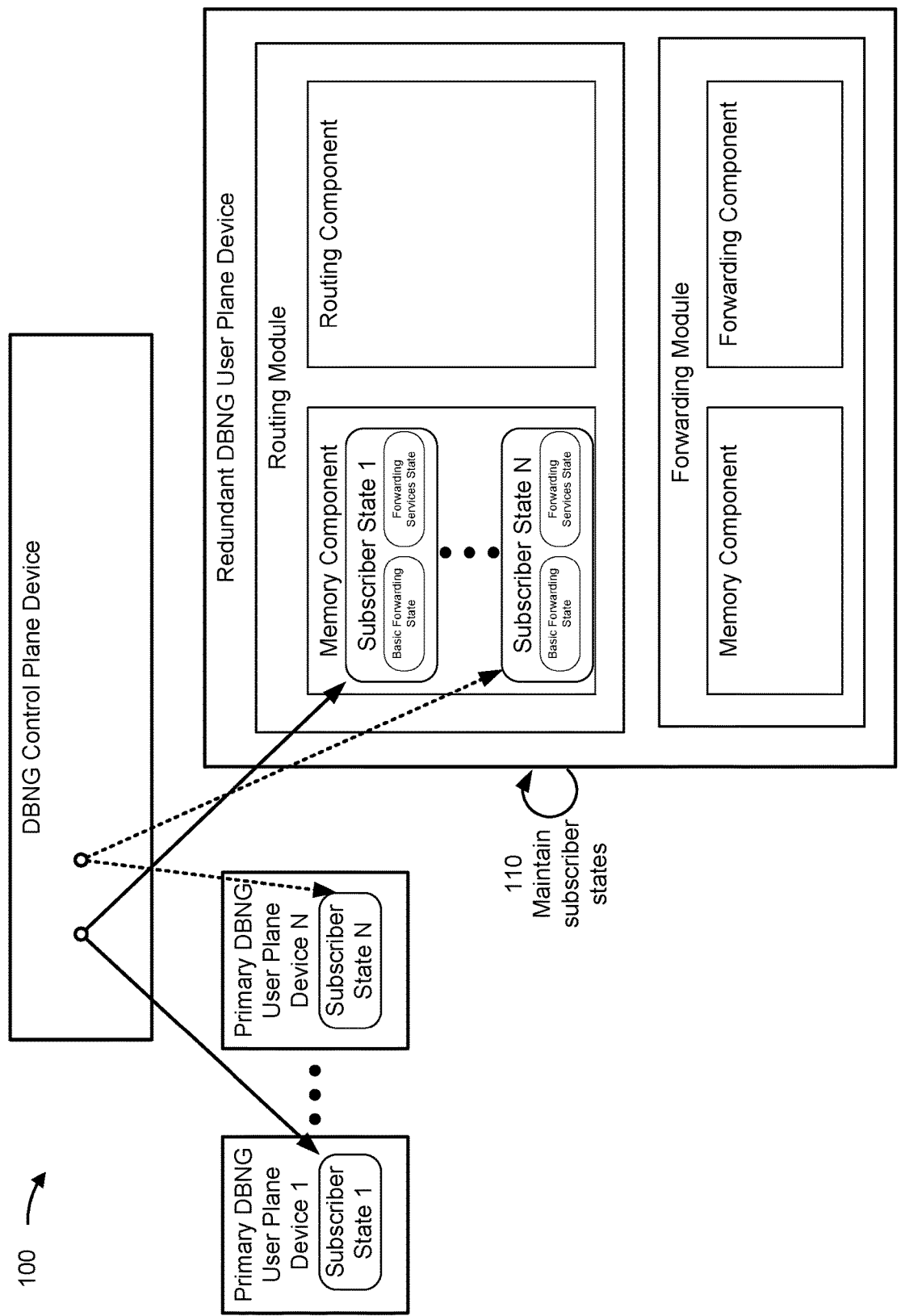
Figure 1D:
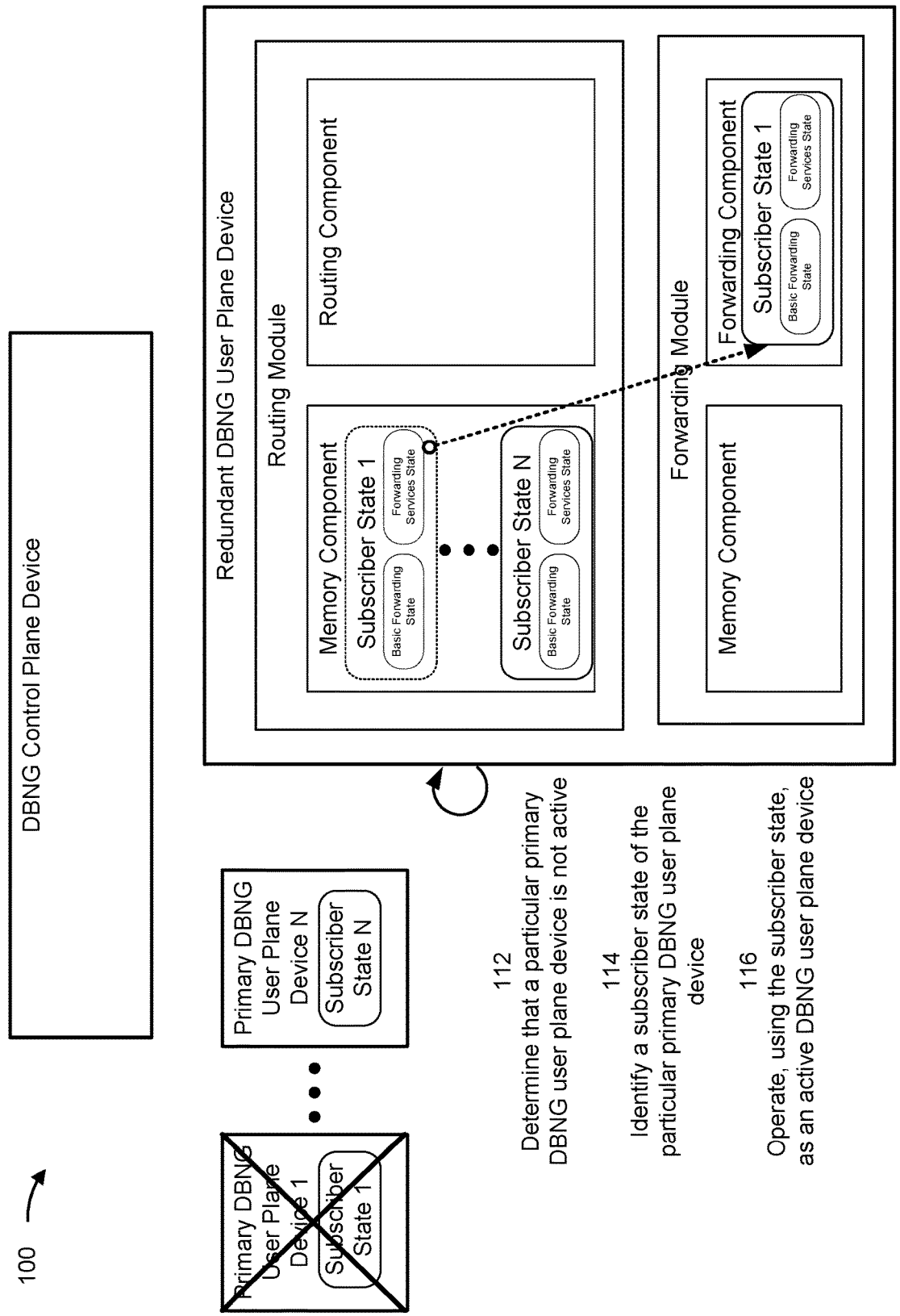

FIGS. 1C-1D show example operations that are associated with employment of a second type of the stateful N+1 hot-redundancy (e.g., for the plurality of primary DBNG user plane devices).

As shown in FIG. 1C, and by reference number 110, the redundant DBNG user plane device may maintain respective subscriber states of the plurality of primary DBNG user plane devices (e.g., in a similar manner as that described herein in relation to FIG. 1A and reference number 102). In a specific example (e.g., that is associated with employing the second type of stateful N+1 hot-redundancy), as further shown in FIG. 1C, the redundant DBNG user plane device may maintain the respective subscriber states of the primary DBNG user plane devices in a routing module (e.g., a routing engine module, or a similar type of routing module) of the redundant DBNG user plane device, such as in a memory component of the routing module. In some implementations, because the memory component of the routing module of the redundant DBNG user plane device may be larger (e.g., in terms of data capacity) than the memory component of the forwarding module, the redundant DBNG user plane device may be able to maintain a greater quantity of subscriber states (and thus may be a redundant DBNG user plane device for a greater quantity of primary DBNG user plane devices) when employing the second type of stateful N+1 hot-redundancy, as compared to when employing the first type of stateful N+1 hot-redundancy.

As shown in FIG. 1D, and by reference number 112, the redundant DBNG user plane device may determine (e.g., based on maintaining the respective subscriber states of the plurality of primary DBNG user plane devices) that a particular primary DBNG user plane device is not active (e.g., because the primary DBNG user plane device has failed, is down due to maintenance, or is not active for another reason), such as in an similar manner as that described herein in relation to FIG. 1B and reference number 104. For example, the redundant DBNG user plane device may determine that a particular primary DBNG user plane device is not active by monitoring a link associated with the particular primary DBNG user plane device and/or by communicating with the DBNG control plane device.

As shown by reference number 114, the redundant DBNG user plane device may identify a subscriber state of the particular primary DBNG user plane device (e.g., that is not active). For example, the redundant DBNG user plane device may identify the subscriber state in the routing module (e.g., in the memory component of the routing module) of the redundant DBNG user plane device. As shown, the subscriber state may include one or more states (e.g., sub-states), such as a basic forwarding state (e.g., that includes basic packet forwarding information) and/or a forwarding services state (e.g., that includes filters and/or policies, hardware queues, statistics counters, and/or the like).

As shown by reference number 116, the redundant DBNG user plane device may operate, using the subscriber state of the particular primary DBNG user plane device (e.g., that is not active), as an active DBNG user plane device. For example, the redundant DBNG user plane device, using the subscriber state, may operate as an active DBNG user plane device for traffic that is associated with the particular primary DBNG user plane device (e.g., for traffic that would be processed by the particular primary DBNG user plane device if the primary DBNG user plane device were active).

In a specific example (e.g., that is associated with employing the second type of stateful N+1 hot-redundancy), as further shown in FIG. 1D, to operate as an active DBNG user plane device, the redundant DBNG user plane device may install the subscriber state of the primary DBNG user plane device in the forwarding module of the redundant DBNG user plane device (e.g., by installing the subscriber state from the routing module, such as from the memory component of the routing module, in the forwarding component of the forwarding module). The redundant DBNG user plane device then may forward, using the forwarding module (e.g., using the forwarding component of the forwarding module), the traffic that is associated with the particular primary DBNG user plane device.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
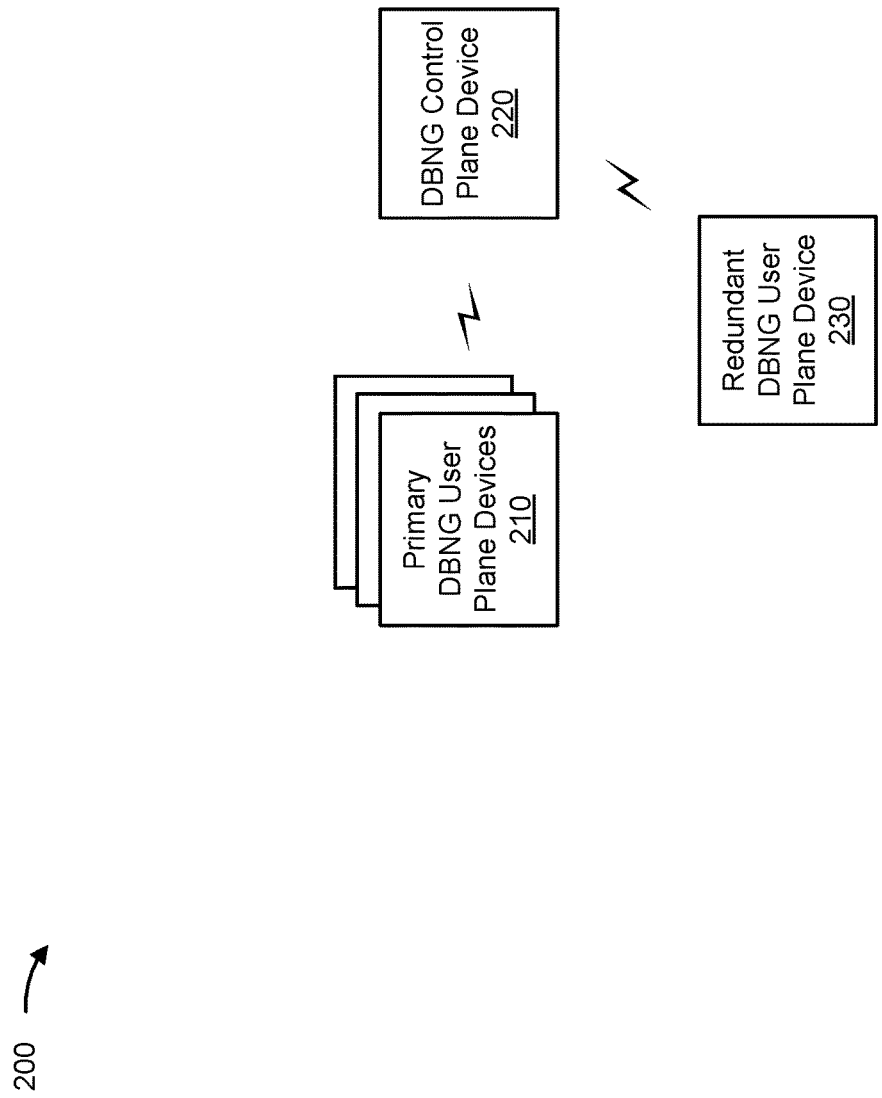
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include multiple primary DBNG user plane devices 210, a DBNG control plane device 220, and a redundant DBNG user plane device 230. The DBNG control plane device 220 may interconnect with the primary DBNG user plane devices 210 and/or the redundant DBNG user plane device 230 via wired connections, wireless connections, or a combination of wired and wireless connections.

Primary DBNG user plane device 210 includes one or more devices capable of receiving, processing, storing, routing, and/or providing information associated with subscriber states and traffic (e.g., a packet and/or other information or metadata) in a manner described herein. For example, the primary DBNG user plane device 210 may include a router, such as a label switching router (LSR), a label edge router (LER), an ingress router, an egress router, a provider router (e.g., a provider edge router or a provider core router), a virtual router, or another type of router. Additionally, or alternatively, the primary DBNG user plane device 210 may include a gateway, a switch, a firewall, a hub, a bridge, a reverse proxy, a server (e.g., a proxy server, a cloud server, or a data center server), a load balancer, and/or a similar device. In some implementations, the primary DBNG user plane device 210 may be a physical device implemented within a housing, such as a chassis. In some implementations, the primary DBNG user plane device 210 may be a virtual device implemented by one or more computing devices of a cloud computing environment or a data center. The primary DBNG user plane device 210 may perform user plane functionality (e.g., primary user plane functionality) for a DBNG environment. In some implementations, the primary DBNG user plane device 210 may communicate with the DBNG control plane device 220, as described herein.

DBNG control plane device 220 includes one or more devices capable of receiving, processing, storing, routing, and/or providing information associated with subscriber states in a manner described herein. For example, the DBNG control plane device 220 may include a router, such as an LSR, an LER, an ingress router, an egress router, a provider router (e.g., a provider edge router or a provider core router), a virtual router, or another type of router. Additionally, or alternatively, the DBNG control plane device 220 may include a gateway, a switch, a firewall, a hub, a bridge, a reverse proxy, a server (e.g., a proxy server, a cloud server, or a data center server), a load balancer, and/or a similar device. In some implementations, the DBNG control plane device 220 may be a physical device implemented within a housing, such as a chassis. In some implementations, the DBNG control plane device 220 may be a virtual device implemented by one or more computing devices of a cloud computing environment or a data center. The DBNG control plane device 220 may perform control plane functionality for a DBNG environment. In some implementations, the DBNG control plane device 220 may communicate with the primary DBNG user plane device 210 and the redundant DBNG user plane device 230, as described herein.

Redundant DBNG user plane device 230 includes one or more devices capable of receiving, processing, storing, routing, and/or providing information associated with subscriber states and traffic (e.g., a packet and/or other information or metadata) in a manner described herein. For example, the redundant DBNG user plane device 230 may include a router, such as an LSR, an LER, an ingress router, an egress router, a provider router (e.g., a provider edge router or a provider core router), a virtual router, or another type of router. Additionally, or alternatively, the redundant DBNG user plane device 230 may include a gateway, a switch, a firewall, a hub, a bridge, a reverse proxy, a server (e.g., a proxy server, a cloud server, or a data center server), a load balancer, and/or a similar device. In some implementations, the redundant DBNG user plane device 230 may be a physical device implemented within a housing, such as a chassis. In some implementations, the redundant DBNG user plane device 230 may be a virtual device implemented by one or more computing devices of a cloud computing environment or a data center. The redundant DBNG user plane device 230 may perform user plane functionality (e.g., backup user plane functionality) for a DBNG environment. In some implementations, the redundant DBNG user plane device 230 may communicate with the DBNG control plane device 220, as described herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
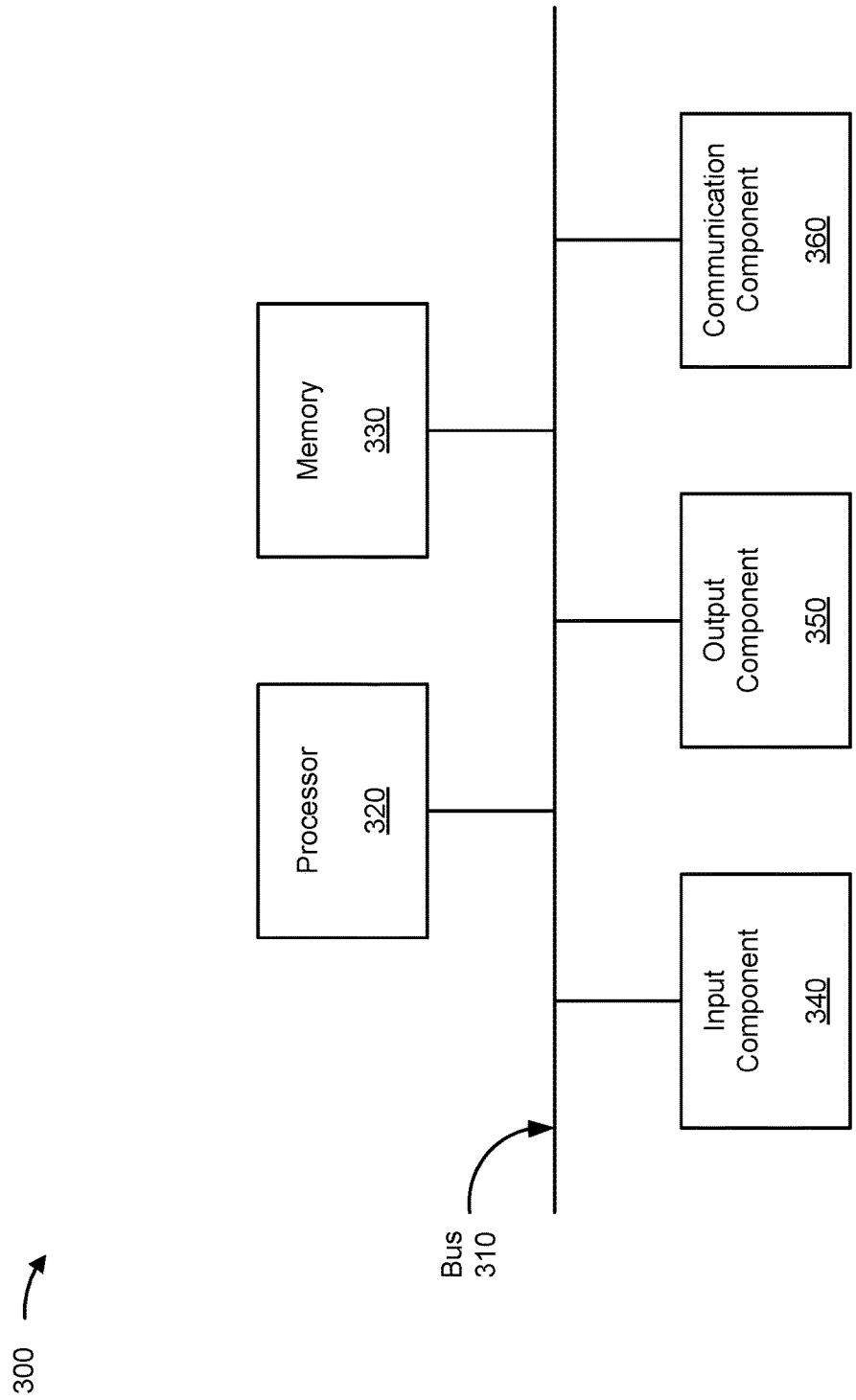
FIG. 3 is a diagram of example components of a device associated with DBNG stateful N+1 hot-redundancy.

FIG. 3 is a diagram of example components of a device 300 associated with DBNG stateful N+1 hot-redundancy. The device 300 may correspond to the primary DBNG user plane device 210, the DBNG control plane device 220, and/or the redundant DBNG user plane device 230. In some implementations, the primary DBNG user plane device 210, the DBNG control plane device 220, and/or the redundant DBNG user plane device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
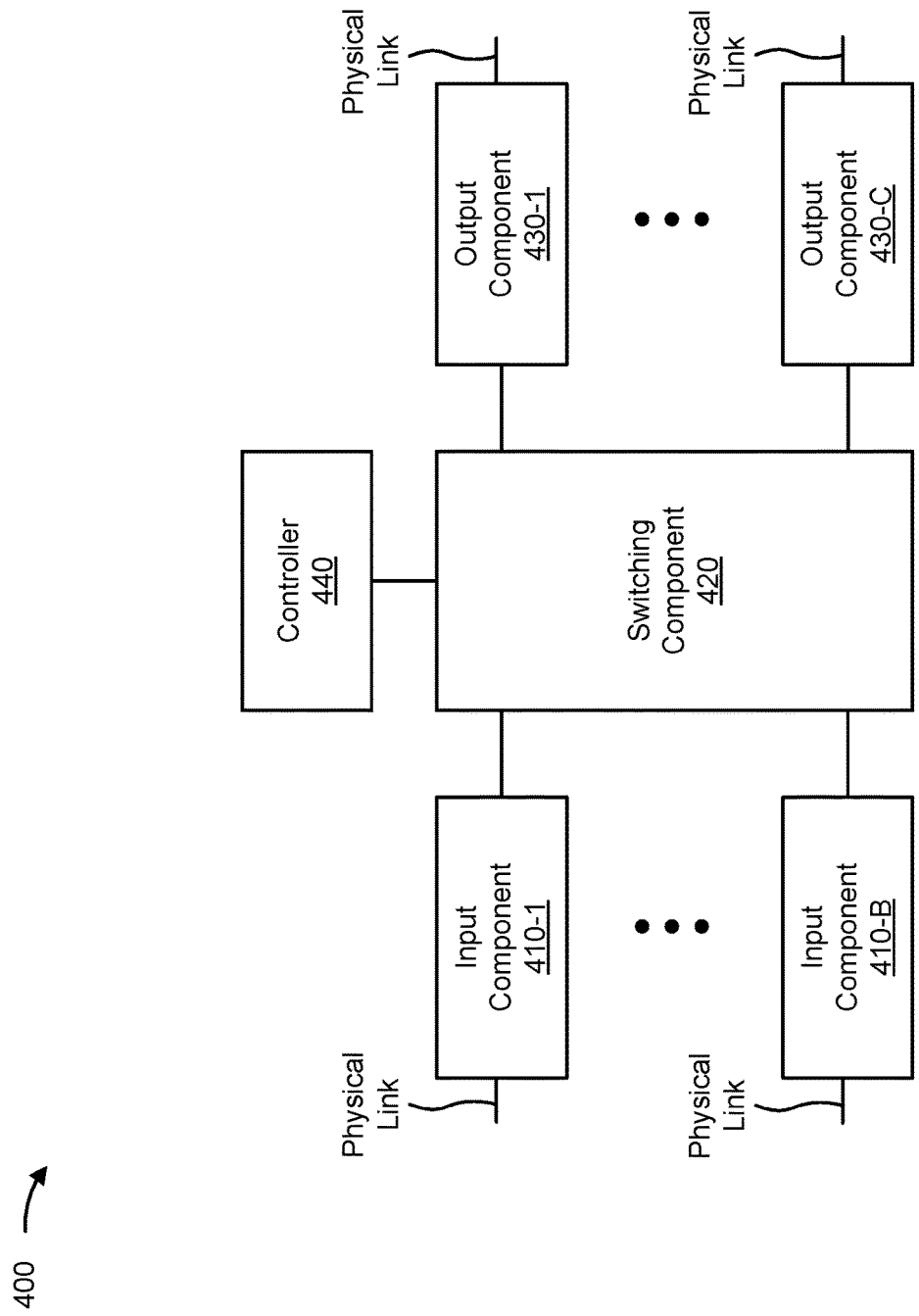
FIG. 4 is a diagram of example components of a device associated with DBNG stateful N+1 hot-redundancy.

FIG. 4 is a diagram of example components of a device 400 associated with DBNG stateful N+1 hot-redundancy. Device 400 may correspond to the primary DBNG user plane device 210, the DBNG control plane device 220, and/or the redundant DBNG user plane device 230. In some implementations, the primary DBNG user plane device 210, the DBNG control plane device 220, and/or the redundant DBNG user plane device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
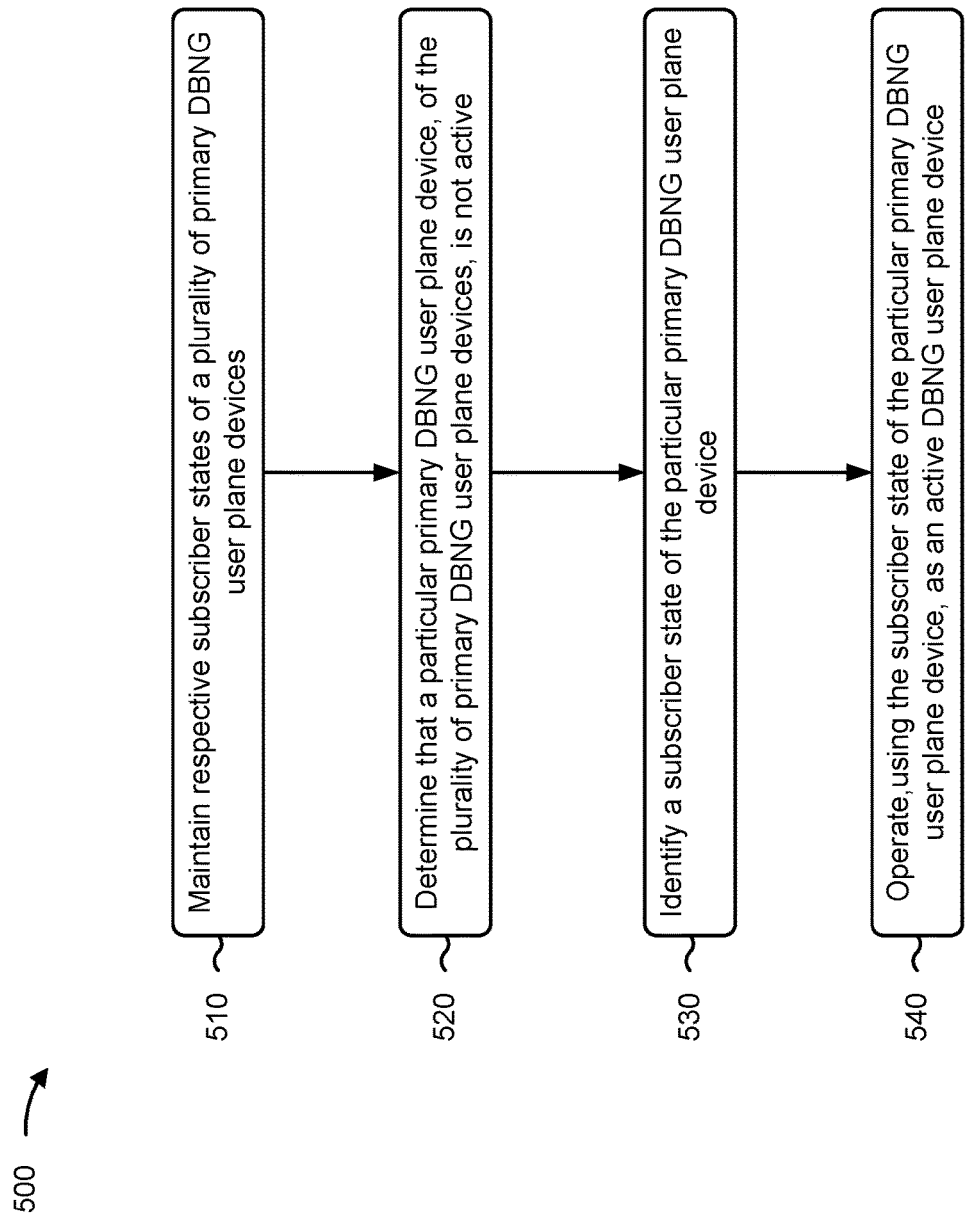
FIG. 5 is a flowchart of an example process associated with DBNG stateful N+1 hot-redundancy.

FIG. 5 is a flowchart of an example process 500 associated with DBNG stateful N+1 hot-redundancy. In some implementations, one or more process blocks of FIG. 5 are performed by a redundant DBNG user plane device (e.g., the redundant DBNG user plane device 230). In some implementations, one or more process blocks of FIG. 5 are performed by another device or a group of devices separate from or including the redundant DBNG user plane device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include maintaining respective subscriber states of a plurality of primary DBNG user plane devices (block 510). For example, the redundant DBNG user plane device may maintain respective subscriber states of a plurality of primary DBNG user plane devices, as described above.

As further shown in FIG. 5, process 500 may include determining that a particular primary DBNG user plane device, of the plurality of primary DBNG user plane devices, is not active (block 520). For example, the redundant DBNG user plane device may determine that a particular primary DBNG user plane device, of the plurality of primary DBNG user plane devices, is not active, as described above.

As further shown in FIG. 5, process 500 may include identifying a subscriber state of the particular primary DBNG user plane device (block 530). For example, the redundant DBNG user plane device may identify a subscriber state of the particular primary DBNG user plane device, as described above.

As further shown in FIG. 5, process 500 may include operating, using the subscriber state of the particular primary DBNG user plane device, as an active DBNG user plane device e (block 540). For example, the redundant DBNG user plane device may operate, using the subscriber state of the particular primary DBNG user plane device, as an active DBNG user plane device (e.g., for traffic associated with the particular primary DBNG user plane device), as described above.

Process 500 may include additional implementations, such as any single implementation or any combination of implementations described below and/or in connection with one or more other processes described elsewhere herein.

In a first implementation, the redundant DBNG user plane device maintains first portions of the respective subscriber states of the plurality of primary DBNG user plane devices in a forwarding component of a forwarding module of the redundant disaggregated DBNG user plane device and maintains second portions of the respective subscriber states of the plurality of primary DBNG user plane devices in a memory component of the forwarding module of the redundant disaggregated DBNG user plane device.

In a second implementation, alone or in combination with the first implementation, operating as an active DBNG user plane device comprises installing a second portion of the subscriber state of the particular primary DBNG user plane device from the memory component in the forwarding component of the forwarding module, and forwarding, using the forwarding component and based on installing the second portion of the subscriber state in the forwarding component, the traffic.

In a third implementation, alone or in combination with one or more of the first and second implementations, the redundant DBNG user plane device maintains the respective subscriber states of the plurality of primary DBNG user plane devices in a memory component of a routing module of the redundant DBNG user plane device.

In a fourth implementation, alone or in combination with one or more of the first through third implementations, operating as an active DBNG user plane device comprises installing the subscriber state of the particular primary DBNG user plane device from the memory component of the routing module in a forwarding component of a forwarding module of the redundant DBNG user plane device, and forwarding, using the forwarding component and based on installing the subscriber state in the forwarding component, the traffic.

In a fifth implementation, alone or in combination with one or more of the first through fourth implementations, determining that the particular primary DBNG user plane device is not active comprises monitoring a link associated with the particular primary DBNG user plane device for activity information, and determining, based on monitoring the link, that the particular primary DBNG user plane device is not active.

In a sixth implementation, alone or in combination with one or more of the first through fifth implementations, determining that the particular primary DBNG user plane device is not active comprises communicating with a DBNG control plane device that is associated with the redundant DBNG user plane device, and determining, based on communicating with the DBNG control plane device, that the particular primary DBNG user plane device is not active.

In a seventh implementation, alone or in combination with one or more of the first through sixth implementations, maintaining the respective subscriber states of the plurality of primary DBNG user plane devices comprises communicating with a DBNG control plane device that is associated with the redundant DBNG user plane device to obtain update information associated with the respective subscriber states, and storing the update information in a data structure.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
maintaining, by a redundant disaggregated broadband network gateway (DBNG) user plane device, respective subscriber states of a plurality of primary DBNG user plane devices,
wherein the plurality of primary DBNG user plane devices communicate with a DBNG control plane device, that is associated with the redundant DBNG user plane device, to obtain update information associated with respective subscriber states of the plurality of primary DBNG user plane devices, and
wherein the redundant DBNG user plane device communicates with the DBNG control plane device to obtain the update information from the DBNG control plane device;
determining, by the redundant DBNG user plane device, and based on the maintaining the respective subscriber states, that a particular primary DBNG user plane device, of the plurality of primary DBNG user plane devices, is not active;
identifying, by the redundant DBNG user plane device and based on determining that the particular primary DBNG user plane device is not active, a subscriber state of the particular primary DBNG user plane device; and
operating, by the redundant DBNG user plane device and using the subscriber state of the particular primary DBNG user plane device, as an active DBNG user plane device for traffic associated with the particular primary DBNG user plane device,
wherein operating as an active DBNG user plane device comprises:
forwarding the traffic.

2. The method of claim 1, wherein the redundant DBNG user plane device maintains first portions of the respective subscriber states of the plurality of primary DBNG user plane devices in a forwarding component of a forwarding module of the redundant disaggregated DBNG user plane device and maintains second portions of the respective subscriber states of the plurality of primary DBNG user plane devices in a memory component of the forwarding module of the redundant disaggregated DBNG user plane device.

3. The method of claim 2, wherein operating as an active DBNG user plane device comprises:
installing a second portion of the subscriber state of the particular primary DBNG user plane device from the memory component in the forwarding component of the forwarding module; and
wherein forwarding the traffic comprises:
forwarding, using the forwarding component and based on installing the second portion of the subscriber state in the forwarding component, the traffic.

4. The method of claim 1, wherein the redundant DBNG user plane device maintains the respective subscriber states of the plurality of primary DBNG user plane devices in a memory component of a routing module of the redundant DBNG user plane device.

5. The method of claim 4, wherein operating as an active DBNG user plane device comprises:
installing the subscriber state of the particular primary DBNG user plane device from the memory component of the routing module in a forwarding component of a forwarding module of the redundant DBNG user plane device; and
wherein forwarding the traffic comprises:
forwarding, using the forwarding component and based on installing the subscriber state in the forwarding component, the traffic.

6. The method of claim 1, wherein determining that the particular primary DBNG user plane device is not active comprises:
monitoring a link associated with the particular primary DBNG user plane device for activity information; and
determining, based on monitoring the link, that the particular primary DBNG user plane device is not active.

7. The method of claim 1, wherein determining that the particular primary DBNG user plane device is not active comprises:
communicating with the DBNG control plane device that is associated with the redundant DBNG user plane device; and
determining, based on communicating with the DBNG control plane device, that the particular primary DBNG user plane device is not active.

8. The method of claim 1, wherein maintaining the respective subscriber states of the plurality of primary DBNG user plane devices comprises:
communicating with the DBNG control plane device to obtain the update information associated with the respective subscriber states; and
storing the update information in a data structure.

9. A non-transitory computer-readable medium storing a set of instructions, the set of instructions comprising:
one or more instructions that, when executed by one or more processors of a redundant disaggregated broadband network gateway (DBNG) user plane device, cause the redundant DBNG user plane device to:
maintain respective subscriber states of a plurality of primary DBNG user plane devices,
wherein the plurality of primary DBNG user plane devices communicate with a DBNG control plane device, that is associated with the redundant DBNG user plane device, to obtain update information associated with respective subscriber states of the plurality of primary DBNG user plane devices, and
wherein the redundant DBNG user plane device communicates with the DBNG control plane device to obtain the update information from the DBNG control plane device;
determine, based on maintaining the respective subscriber states of the plurality of primary DBNG user plane devices, that a particular primary DBNG user plane device is not active; and operate, using a subscriber state of the particular primary DBNG user plane device, as an active DBNG user plane device for traffic associated with the particular primary DBNG user plane device.

10. The non-transitory computer-readable medium of claim 9, wherein the redundant DBNG user plane device maintains the respective subscriber states of the plurality of primary DBNG user plane devices in a forwarding module of the redundant disaggregated DBNG user plane device.

11. The non-transitory computer-readable medium of claim 10, wherein the one or more instructions, that cause the redundant DBNG user plane device to operate as an active DBNG user plane device, cause the redundant DBNG user plane device to:

install a portion of the subscriber state of the particular primary DBNG user plane device in a forwarding component of the forwarding module; and forward, using the forwarding component and based on installing the subscriber state in the forwarding component, the traffic.

12. The non-transitory computer-readable medium of claim 9, wherein the redundant DBNG user plane device maintains the respective subscriber states of the plurality of primary DBNG user plane devices in a routing module of the redundant DBNG user plane device.

13. The non-transitory computer-readable medium of claim 12, wherein the one or more instructions, that cause the redundant DBNG user plane device to operate as an active DBNG user plane device, cause the redundant DBNG user plane device to:

install the subscriber state of the particular primary DBNG user plane device from the routing module in a forwarding component of a forwarding module of the redundant DBNG user plane device; and forward, using the forwarding component and based on installing the subscriber state in the forwarding component, the traffic.

14. The non-transitory computer-readable medium of claim 9, wherein the one or more instructions, that cause the redundant DBNG user plane device to determine that the particular primary DBNG user plane device is not active, cause the redundant DBNG user plane device to:

determine, based on monitoring a link associated with the particular primary DBNG user plane device, that the particular primary DBNG user plane device is not active.

15. The non-transitory computer-readable medium of claim 9, wherein the one or more instructions, that cause the redundant DBNG user plane device to determine that the particular primary DBNG user plane device is not active, cause the redundant DBNG user plane device to:

determine, based on communicating with the DBNG control plane device, that the particular primary DBNG user plane device is not active.

16. A redundant disaggregated broadband network gateway (DBNG) user plane device, comprising:

one or more memories; and
one or more processors to:

maintain respective subscriber states of a plurality of primary DBNG user plane devices, wherein the plurality of primary DBNG user plane devices communicate with a DBNG control plane device, that is associated with the redundant DBNG user plane device, to obtain update information associated with respective subscriber states of the plurality of primary DBNG user plane devices, and wherein the redundant DBNG user plane device communicates with the DBNG control plane device to obtain the update information from the DBNG control plane device;

determine, based on maintaining the respective subscriber states of the plurality of primary DBNG user plane devices, that a particular primary DBNG user plane device is not active; and operate, using a subscriber state of the particular primary DBNG user plane device, as an active DBNG user plane device.

17. The redundant DBNG user plane device of claim 16, wherein the redundant DBNG user plane device maintains the respective subscriber states of the plurality of primary DBNG user plane devices in a forwarding module of the redundant DBNG user plane device.

18. The redundant DBNG user plane device of claim 17, wherein the one or more processors, to operate as an active DBNG user plane device, are to:

install a portion of the subscriber state of the particular primary DBNG user plane device in the forwarding module; and forward, using the forwarding module, traffic that is associated with the particular primary DBNG user plane device.

19. The redundant DBNG user plane device of claim 16, wherein the redundant DBNG user plane device maintains the respective subscriber states of the plurality of primary DBNG user plane devices in a routing module of the redundant DBNG user plane device.

20. The redundant DBNG user plane device of claim 19, wherein the one or more processors, to operate as an active DBNG user plane device, are to:

install the subscriber state of the particular primary DBNG user plane device in a forwarding module of the redundant DBNG user plane device; and forward, using the forwarding module, traffic that is associated with the particular primary DBNG user plane device.

* * * * *